UNITED STATES PATENT OFFICE.

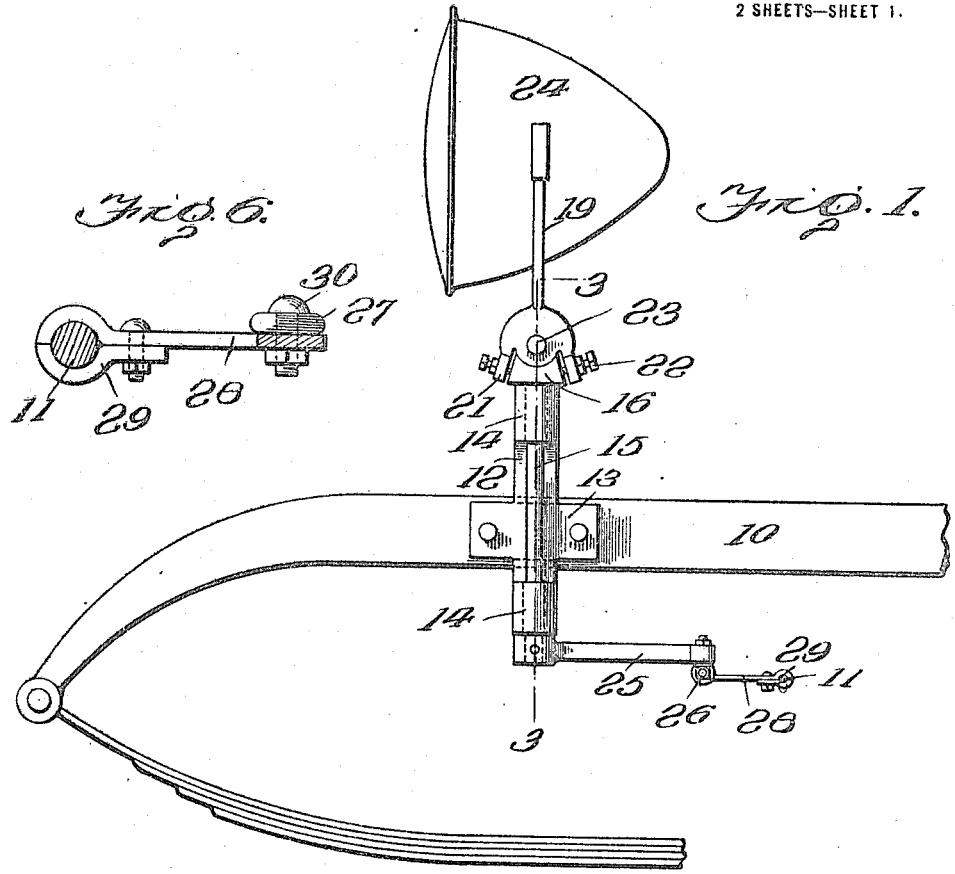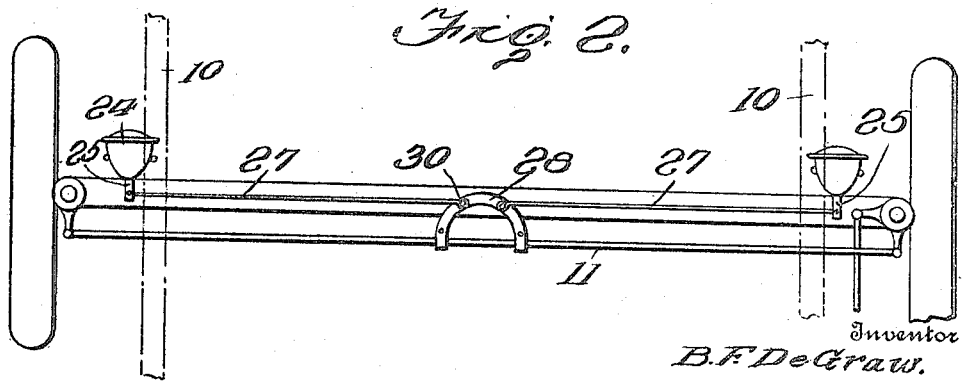

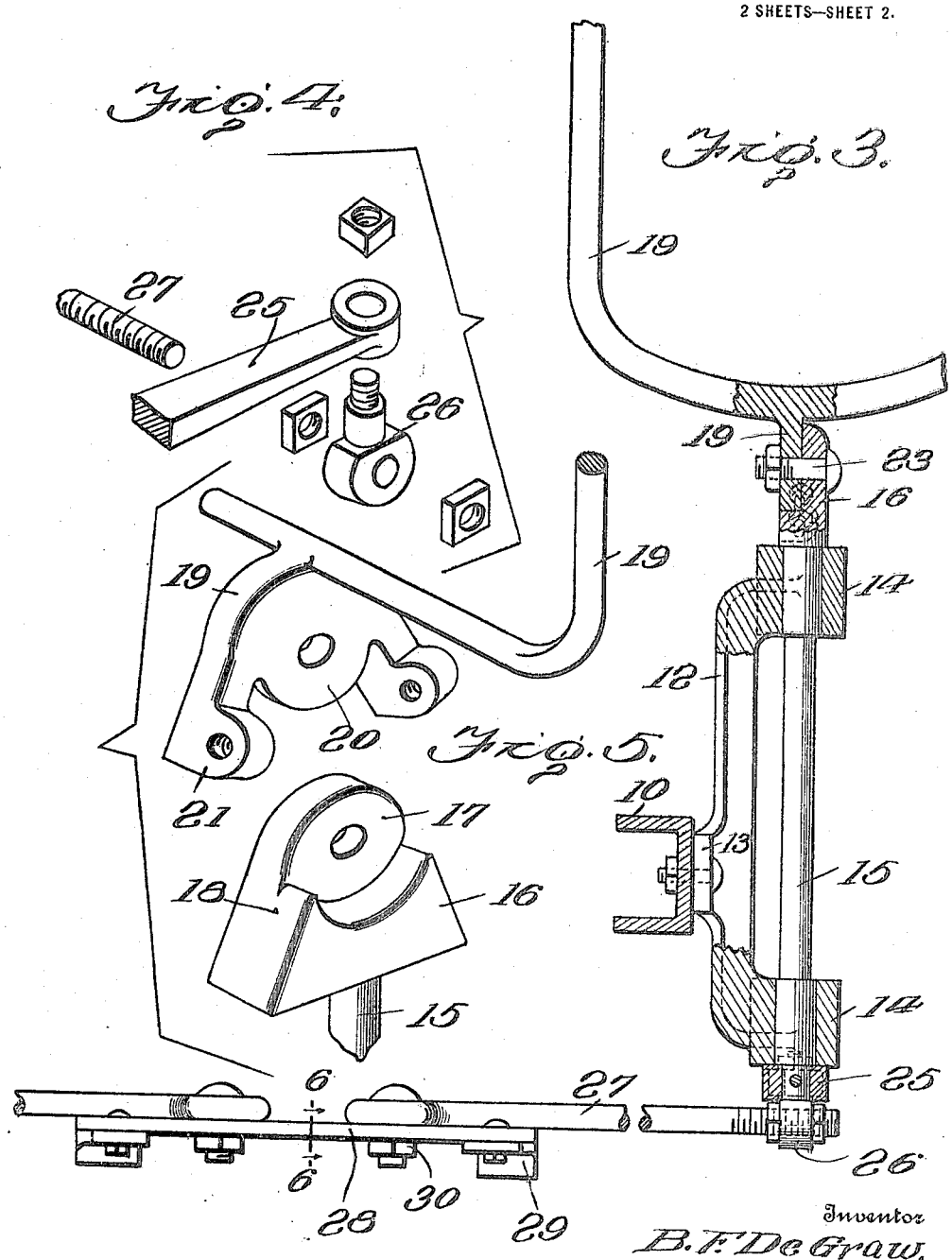

BROWN F. DE GRAW, OF SPRINGFIELD, OHIO.

DIRIGIBLE HEADLIGHT MECHANISM.

1,229,907. Specification of Letters Patent. Patented June 12, 1917.

Application filed October 13, 1915. Serial No. 55,667.

*To all whom it may concern:*

Be it known that I, BROWN F. DE GRAW, a citizen of the United States, residing at Springfield, in the county of Clark and State of Ohio, have invented certain new and useful Improvements in Dirigible Headlight Mechanism, of which the following is a specification.

This invention contemplates an improved dirigible headlight mechanism for motor vehicles and has as its primary object to provide a mechanism of this character adapted for attachment to the steering mechanism of the vehicle so that the rays of the headlights will be directed in the path of the vehicle as the vehicle is steered.

The invention has as a further object to provide an improved mounting for the lamp brackets of the mechanism of such character that the lamps may be adjusted relative to the horizontal so that the rays thereof may be caused to strike the road at a greater or less distance in advance of the motor vehicle.

And a still further object of the invention is to provide an improved mechanism of this character which will be simple in construction and which may be readily applied to any conventional type of motor vehicle without the necessity of structural change therein.

Other and incidental objects will appear as the description proceeds and in the drawings wherein I have illustrated the preferred embodiment of the invention and wherein similar reference characters designate corresponding parts throughout the several views, Figure 1 is a side elevation particularly showing the mounting of the lamp receiving forks of my improved mechanism, Fig. 2 is a plan view showing the manner in which the steering mechanism for the lamps is attached to the connecting rod of the steering mechanism of the motor vehicle, Fig. 3 is a fragmentary front elevation partly in section and particularly showing the mounting of the posts which carry the lamp receiving forks, Fig. 4 is a fragmentary perspective view showing the connection between the crank arms carried by the posts supporting the lamps and the outer ends of the links having operative connection with the connecting rod of the vehicle steering mechanism, Fig. 5 is a similar view particularly showing the mounting of the lamp receiving forks, and Fig. 6 is a sectional view taken on the line 6—6 of Fig. 3 and looking in the direction of the arrows, this view particularly showing the mounting of the member attached to the connecting rod of the steering mechanism of the vehicle.

For convenience, I have shown my improved mechanism in connection with the side members 10 of a conventional type of motor vehicle which includes as a part of the steering mechanism thereof, a connecting rod 11. Mounted upon the side members 10 adjacent the forward extremities thereof are oppositely disposed brackets 12 each formed with a flattened attaching portion 13 having arms extending in opposite directions therefrom and provided with alined bearings 14. The attaching portions 13 of the brackets may be secured to the side members 10 by bolts, as illustrated, or in any other suitable manner.

Rotatably mounted in the bearings 14 of the brackets 12 are posts 15 which, at their upper extremities, are provided with heads 16 each cut away upon one side to provide a seat including a substantially circular bearing portion or disk 17, with the side edges of the head sloping away from the said bearing portion in opposite directions to form oppositely inclined shoulders 18. Pivotally connected to the heads 16 of the post are substantially U-shaped lamp receiving forks 19 upon the bight portions of which are formed transversely arranged and laterally projecting attaching members 19, each having the body portion thereof formed into a substantially circular bearing portion or disk 20 adapted to mate with one of the disks 17 of the heads 16 and provided with outwardly diverging and oppositely disposed arms 21 arranged to confront the side edges of the head 16 associated therewith. The arms 21 of said attaching members are provided with laterally projecting ears which adjustably receive set screws 22 adapted to coact with the shoulders 18 of the heads, and pivotally connecting the attaching members with the heads are bolts or other suitable form of pivot pins 23.

The forks 19 are adapted to receive the headlights conventionally shown at 24 in Fig. 1 and it will now be observed that by relatively adjusting the set screws 22 of each of the attaching members 19 to engage the shoulders 18 arranged to coact therewith, the lamps 24 may be positioned relative to the horizontal upon the posts 15 so that the rays of the lamps may be caused to strike the road surface at a greater or less distance in advance of the motor vehicle.

Keyed to the lower extremities of the posts 15 are crank arms 25 to the outer ends of which are swingingly connected eye bolts 26 screw threaded to adjustably receive the outer ends of links 27, provided with jam nuts engaging opposite sides of the eye bolts. Associated with the links is a substantially U-shaped or semi-circular connecting member 28, the ends of which are channeled to fit over the connecting rod 11 as more particularly shown in Fig. 6 and are provided with mating clips 29 detachably connecting the said member to the connecting rod with the member extending forwardly therefrom, as more particularly shown in Figs. 1 and 2 to receive the inner ends of the links 27 which are provided with eyes and are pivotally connected to the bight portion of the member 28 at oppositely disposed points by bolts or other suitable fastening means 30.

It will now be seen that when the vehicle is steered and the connecting rod is shifted longitudinally, corresponding shifting movement will be imparted to the crank arms 25 which will in turn rotate the post 15 to turn the lamps 24 so that the rays of the lamps will be directed in the path of movement of the machine. By adjusting the links 27 through the eye bolts 26, the lamps may be properly focused relative to each other. The entire mechanism is exceedingly simple in construction and, as will be at once obvious, may be readily applied to any conventional type of motor vehicle without the necessity of structural change therein.

Having thus described my invention, what I claim and desire to secure by Letters Patent is:

1. In mechanism of the character described, a lamp supporting post provided with a head having laterally directed shoulders and formed with a seat, a lamp mounting pivotally connected to the head and received within said seat, arms depending from the said mounting at opposite sides of the head and confronting said shoulders, and means carried by the arms and arranged to coact with said shoulders in the plane of pivotal movement of the mounting for adjusting the said mounting with respect to the post.

2. In mechanism of the character described, a lamp supporting post having a head cut away to provide a seat, a lamp mounting provided with a bearing portion received within said seat and pivotally connected to the head, arms projecting from opposite sides of the bearing portion of the said mounting and confronting opposite sides of the head, and set screws carried by the said arms in the plane of pivotal movement of the mounting and arranged to engage opposite side faces of the head for adjusting the said mounting with respect to the post.

In testimony whereof I affix my signature.

BROWN F. DE GRAW. [L. S.]

Copies of this patent may be obtained for five cents each, by addressing the "Commissioner of Patents, Washington, D. C."